(12) United States Patent
Jamal et al.

(10) Patent No.: US 12,164,280 B2
(45) Date of Patent: Dec. 10, 2024

(54) METHOD FOR ESTIMATING INTENTION USING UNSUPERVISED LEARNING

(71) Applicants: Hyundai Motor Company, Seoul (KR); Kia Corporation, Seoul (KR)

(72) Inventors: Muhammad Zahak Jamal, Yongin-si (KR); Ju Young Yoon, Suwon-si (KR); Dong Hyun Lee, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 265 days.

(21) Appl. No.: 17/844,361

(22) Filed: Jun. 20, 2022

(65) Prior Publication Data
US 2023/0021447 A1    Jan. 26, 2023

(30) Foreign Application Priority Data

Jul. 26, 2021 (KR) .......... 10-2021-0098062

(51) Int. Cl.
| | |
|---|---|
| *G05B 19/00* | (2006.01) |
| *B25J 9/16* | (2006.01) |
| *B25J 13/02* | (2006.01) |
| *G05B 19/4155* | (2006.01) |
| *G06F 3/01* | (2006.01) |
| *G06F 3/14* | (2006.01) |

(52) U.S. Cl.
CPC ........ *G05B 19/4155* (2013.01); *B25J 9/1612* (2013.01); *B25J 13/02* (2013.01); *G06F 3/015* (2013.01); *G06F 3/14* (2013.01); *G05B 2219/40264* (2013.01)

(58) Field of Classification Search
None
See application file for complete search history.

(56) References Cited

U.S. PATENT DOCUMENTS

| | | |
|---|---|---|
| 7,019,825 B2 | 3/2006 | Roh et al. |
| 8,280,837 B2 | 10/2012 | Platt et al. |
| 8,437,844 B2 | 5/2013 | Syed Momen et al. |
| 9,392,954 B2 | 7/2016 | Morita et al. |
| 2004/0102911 A1 | 5/2004 | Roh et al. |
| 2006/0095226 A1 | 5/2006 | Roh et al. |
| 2008/0058668 A1 | 3/2008 | Seyed Momen et al. |

(Continued)

FOREIGN PATENT DOCUMENTS

| | | |
|---|---|---|
| CA | 2661150 C | 8/2015 |
| CN | 107526952 A | 12/2017 |

(Continued)

*Primary Examiner* — Truc M Do
(74) *Attorney, Agent, or Firm* — Slater Matsil, LLP

(57) ABSTRACT

This patent proposal document provides a complete robot hand control scheme using myoelectric intention estimation of the human being using the kernel Principal Component Analysis Algorithm (kPCA). The robot hand system includes a biometric EMG sensor system, a robot hand including with multiple fingers, a controller connected with the biometric EMG sensor system, and a robot hand. The controller acquires the biometric EMG signal by means of a biometric sensor system, estimates myoelectric motion intention by applying the kernel principal component analysis (kPCA) algorithm using a kernel function, and delivers a control command corresponding to the estimated motion intention of the user to the robot hand.

20 Claims, 20 Drawing Sheets

(56) References Cited

U.S. PATENT DOCUMENTS

| | | | |
|---|---|---|---|
| 2009/0031825 A1* | 2/2009 | Kishida | G01L 5/228 |
| | | | 73/862.621 |
| 2010/0293115 A1 | 11/2010 | Seyed Momen | |
| 2010/0306159 A1 | 12/2010 | Platt et al. | |
| 2012/0209134 A1 | 8/2012 | Morita et al. | |
| 2017/0348858 A1 | 12/2017 | Chiu | |
| 2019/0008419 A1* | 1/2019 | Yoshizawa | A61B 5/389 |
| 2019/0105779 A1* | 4/2019 | Einav | B25J 9/1689 |
| 2021/0170590 A1* | 6/2021 | Laftchiev | B25J 9/163 |
| 2022/0026920 A1* | 1/2022 | Ebrahimi Afrouzi | G06N 7/01 |

FOREIGN PATENT DOCUMENTS

| | | | |
|---|---|---|---|
| JP | 2010280054 | A | 12/2010 |
| JP | 5545574 | B2 | 7/2014 |
| KR | 20040044620 | A | 5/2004 |
| KR | 20170078269 | A | 7/2017 |
| KR | 20170140127 | A | 12/2017 |
| KR | 20200026617 | A | 3/2020 |
| KR | 20200083338 | A | 7/2020 |

* cited by examiner

METHOD FOR ESTIMATING INTENTION USING UNSUPERVISED LEARNING

CROSS-REFERENCE TO RELATED APPLICATIONS

This application claims the benefit of Korean Patent Application No. 10-2021-0098062, filed on Jul. 26, 2021, which application is hereby incorporated herein by reference.

TECHNICAL FIELD

The present disclosure relates to technologies for estimating an intention using unsupervised learning.

BACKGROUND

Electromyography (EMG) is a technology for obtaining important information associated with muscle contraction when muscles generate a force. A technology using EMG may estimate a myoelectric signal of a human being intention when the human body makes voluntary movement. For example, a robot hand technology estimates an intention of human motion and may move a robot hand by means of the estimated result. A simultaneous and proportional control (SPC) algorithm is an example of a solution used for interaction with such a robot hand.

Contemporary methods in intention estimation are based on supervised learning as one of the technologies of analyzing an intention of motion. Supervised learning is a method for estimating an intention based on correlations between input and output values. And supervised learning generally uses classification, logistic regression, a support vector machine, and neural networks, etc.

SUMMARY

Because a classification scheme is able to recognize only previously specified classes, this method has disadvantages of unnatural estimation of simultaneous activation and has difficulty in performing proportional estimation. Therefore, an unsupervised scheme may be unsuitable to output an SPC command to a robot hand. For example, when a robot hand technology according to supervised learning has difficulty accurately recognizing separate finger motions, it may fail to accurately estimate a motion intention of a patient who is a hand amputee deprived of his fingers.

To overcome a disadvantage of unnatural motion, an estimation method based on supervised learning needs additional hardware such as a load cell or a force sensor. However, such hardware equipment may be unsuitable in terms of compatibility for a hand amputee as he/she would not be able to interact with these sensors using his/her fingers.

Furthermore, because a complex algorithm should be executed to estimate a motion intention of a human body, a robot hand system should use an online analysis to analyze an EMG signal. In this case, usability and portability of the robot hand system may be degraded.

Embodiments of the present disclosure can solve problems occurring in the prior art while advantages achieved by the prior art are maintained intact.

An embodiment of the present disclosure provides a method for estimating an intention depending on unsupervised learning to supplement a disadvantage of estimating an intention based on supervised learning based on the classification scheme.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a robot hand system may include a biometric sensor system, a robot hand including a plurality of fingers, and a controller connected with the biometric sensor system and the robot hand. The controller may be configured to obtain a biometric signal by means of the biometric sensor system, estimate a motion intention by applying a kernel principal component analysis (kPCA) to which at least one kernel function is applied to the biometric signal, and deliver a control command corresponding to the estimated motion intention to the robot hand.

According to another embodiment of the present disclosure, an operation system of a robot hand system may include obtaining a biometric signal, estimating a motion intention by applying a kPCA to which at least one kernel function is applied to the biometric signal, and operating a robot hand in response to the estimated motion intention.

According to another embodiment of the present disclosure, a non-transitory computer-readable storage medium may store a program for performing steps including obtaining a biometric signal, estimating a motion intention by applying a kPCA to which at least one kernel function is applied to the biometric signal, and operating a robot hand in response to the estimated motion intention.

BRIEF DESCRIPTION OF THE DRAWINGS

The above and other objects, features and advantages of embodiments of the present disclosure will be more apparent from the following detailed description taken in conjunction with the accompanying drawings, in which.

Figure 1:
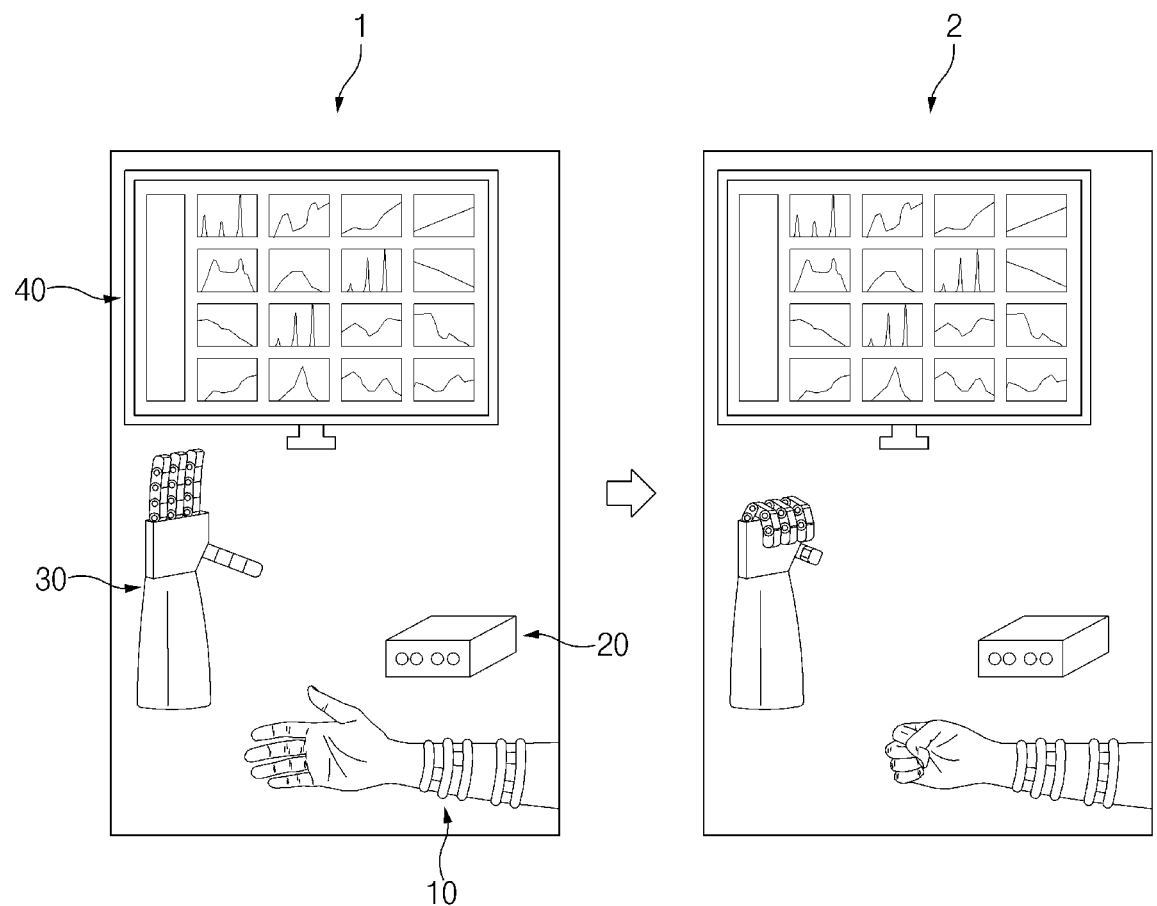
FIG. 1 illustrates a robot hand system according to various embodiments.

With regard to description of drawings, the same or similar denotations may be used for the same or similar components.

DETAILED DESCRIPTION OF ILLUSTRATIVE EMBODIMENTS

Hereinafter, various embodiments of the disclosure will be described with reference to the accompanying drawings. However, it should be understood that this is not intended to limit the present disclosure to specific implementation forms and the present disclosure includes various modifications, equivalents, and/or alternatives of embodiments of the present disclosure.

It should be appreciated that various embodiments of the present disclosure and the terms used therein are not intended to limit the technological features set forth herein to particular embodiments and include various changes, equivalents, or replacements for a corresponding embodiment. With regards to the description of the drawings, similar reference numerals may be used to refer to similar or related elements. It is to be understood that a singular form of a noun corresponding to an item may include one or more of the things, unless the relevant context clearly indicates otherwise. As used herein, each of the expressions "A or B," "at least one of A and B," "at least one of A or B," "A, B, or C," "at least one of A, B, and C," and "at least one of A, B, or C," may include any and all combinations of one or more of the items listed together with a corresponding expression among the expressions. Such terms as "1st" and "2nd," or "first" and "second" may be used to simply distinguish a corresponding component from another, and do not limit the components in other aspects (e.g., importance or order). It is to be understood that if any (e.g., a first) component is referred to, with or without the term "operatively" or "communicatively", as "coupled with," "coupled to," "connected with," or "connected to" another (e.g., a second) component, it means that the element may be coupled with the other element directly (e.g., wiredly), wirelessly, or via a third component.

As used herein, the term "module" used in various embodiments of the present disclosure may include a unit implemented in hardware, software, or firmware, and may be interchangeably used with other terms, such as "logic," "logic block," "part," or "circuitry". A module may be an integral part, or a minimum unit or portion thereof, adapted to perform one or more functions. For example, according to an embodiment, the module may be implemented in a form of an application-specific integrated circuit (ASIC).

Various embodiments of the present disclosure may be implemented as software (e.g., a program) including instructions that are stored in a machine-readable storage medium (e.g., an internal memory or an external memory). For example, the machine may invoke at least one of one or more instructions stored in the storage medium and may execute the invoked instruction. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semi-permanently stored in the storage medium and where data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates a robot hand system according to various embodiments.

Referring to FIG. 1, the robot hand system may include a biometric sensor 10, a control device 20, a robot hand 30, and a display device 40. FIG. 1 illustrates an embodiment in which respective components of the robot hand system are separately present, but the robot hand system may be present as one integrated module.

The biometric sensor 10 may be configured to measure a biometric signal. The biometric signal may be, for example, an electromyography (EMG) signal indicating motion of a muscle of a user. In this case, the biometric sensor 10 may be an EMG sensor including EMG electrodes. The EMG sensor may measure, for example, an EMG signal through a specified number of channels (e.g., 8 channels). The EMG electrodes may be made of silver. To efficiently detect separate finger motion of the user, the EMG electrodes may be suitably arranged on a body of the user. For example, the EMG electrodes may be attached to an arm of the user. A target muscle for obtaining an EMG signal associated with motion of a finger may be a flexor pollicis longus muscle and an abductor pollicis longus muscle for a thumb, flexor digitorum superficialis for an index finger, flexor carpi radialis and palmaris longus for a middle finger, and flexor digitorum profundus for a ring finger.

The control device 20 may process and analyze the biometric signal obtained by means of the biometric sensor 10 to estimate a motion intention of a hand of the user. To estimate a motion intention by means of unsupervised learning, the control device 20 may apply a non-linear kernel principal component analysis (PCA) using at least one kernel function to the biometric signal. The control device 20 may generate a control command for operating the robot hand 30 depending on the estimated motion intention. A configuration of estimating a motion intention and a configuration of generating a control command may be an integrated configuration or separate configurations. The control device 20 may be a hardware device such as a central processing unit (CPU) or a processor, and may be a storage medium which stores instructions such as a program and an application.

The robot hand 30 may operate to be substantially the same as a hand of the user depending on the control command transmitted from the control device 20. For example, as shown in reference numerals 1 and 2, the robot hand 30 may fold or unfold some of fingers to be the same as the hand of the user. In the description below, a shape and an operation of the robot hand 30 having four fingers (e.g., a thumb, an index finger, a middle finger, and a ring finger) are shown for convenience of description, but the robot hand 30 may have substantially the same shape as the hand of the user.

The display device 40 may output, for example, the estimated motion intention in a visual form to provide the user with feedback. For example, the display device 40 may provide feedback in the form of a graph, a table, or other graphic user interfaces (GUIs). According to an embodiment, the robot hand system may not include the display device 40.

Figure 2:
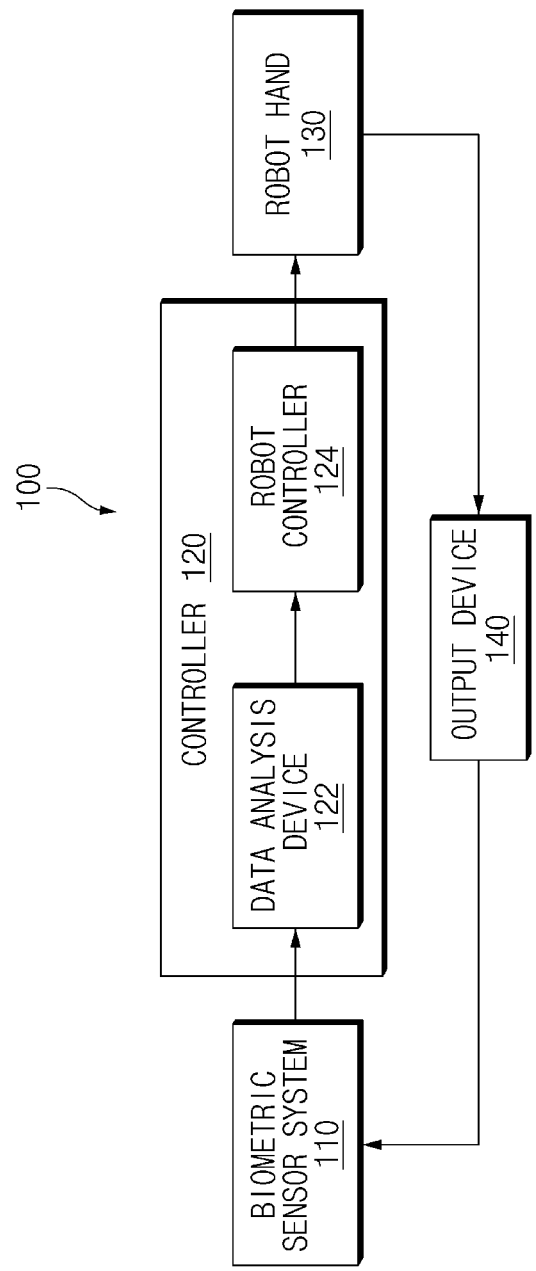
FIG. 2 illustrates a block diagram of a robot hand system according to various embodiments.

FIG. 2 illustrates a block diagram of a robot hand system according to various embodiments.

Referring to FIG. 2, a robot hand system 100 may include a biometric sensor system 110, a controller 120, a robot hand 130, and an output device 140. The component with the same name as the component shown in FIG. 1 among the respective components shown in FIG. 2 may perform the same or similar function, and a duplicated described thereof will be omitted.

The controller 120 (e.g., a control device 20 of FIG. 1) may be connected with the biometric sensor system 110, the robot hand 130, and the output device 140 to perform the overall operation of the robot hand system 100. The controller 120 may include a data analysis device 122 and a robot controller 124. The data analysis device 122 may estimate a motion intention for each of fingers of a user based on unsupervised learning. The robot controller 124 may generate a control command such that the robot hand 130 may move depending on the estimated motion intention. For example, the robot controller 124 may generate the control command based on a proportional, integral, derivative (PID) position control algorithm.

The output device 140 may provide visual feedback on the estimated motion intention like a display device 40 of FIG. 1. In another embodiment, the output device 140 may further output at least one of a sound or vibration.

Figure 3:
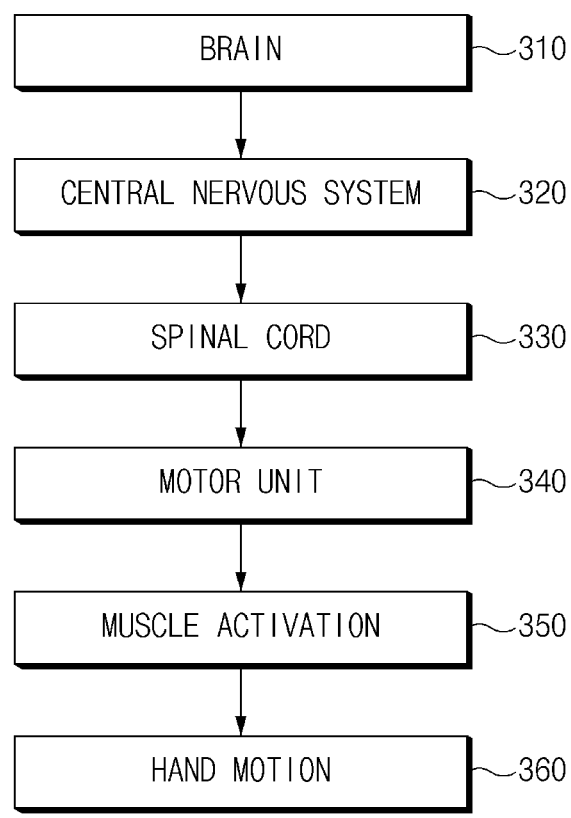
FIG. 3 illustrates a function of a human body for hand motion according to various embodiments.

FIG. 3 illustrates a function of a human body for hand motion according to various embodiments.

Control of the human hand may be composed of a complex neural network moving from a brain 310 to a separate finger. An efferent command may go down through a central nervous system 320 from the brain 310 by means of a synaptic system. The neural network may have a multi-layer structure where all layers make up one unit. The central nervous system 320 may deliver a command, delivered from the brain 310, to a muscular system to control a finger, and a motion command may be intended by the brain 310. Such an intention may be divided into efferent commands delivered to an interstitial nervous system. The command may move through a spinal cord 330 to control a separate muscle (motor unit 340 or muscle activation 350) of an arm which moves each finger (hand motion 360). A combination of muscles forming muscle synergies may be divided into a plurality of layers causing finger motion. A robot hand system 100 of FIG. 2 according to embodiments may implement a multilayer architecture for simultaneous and proportional control (SPC) using a kernel PCA to which a kernel function is applied to imitate the structure of the human body and estimate a motion intention.

Figure 4:
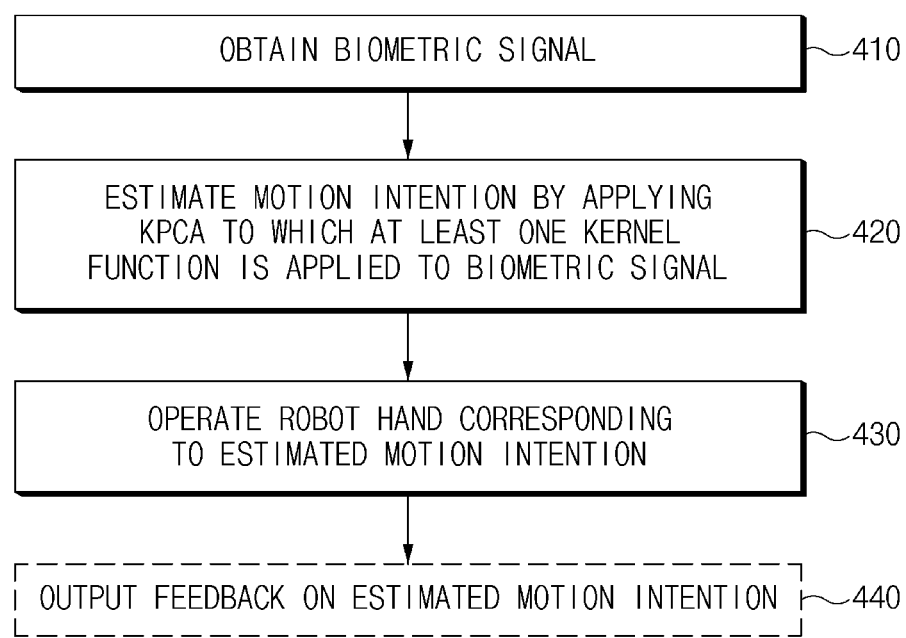
FIG. 4 illustrates an optional flowchart for moving a robot hand depending on an estimated motion intention according to various embodiments.

FIG. 4 illustrates an optional flowchart for moving a robot hand depending on an estimated motion intention according to various embodiments. Operations included in operational flowcharts below, including FIG. 4, may be implemented by a robot hand system 100 of FIG. 2 or may be implemented by each component (e.g., a controller 120 of FIG. 2) included in the robot hand system 100.

Referring to FIG. 4, in operation 410, the robot hand system 100 may obtain a biometric signal. For example, a biometric sensor system 110 of FIG. 2 may measure a plurality of EMG signals over a specified number of channels (e.g., 8 channels).

In operation 420, the robot hand system 100 may estimate a motion intention by applying a kPCA to which at least one kernel function is applied to the biometric signal. A PCA algorithm may be used to dimensionally reduce the number of feature points in a dataset. The kPCA algorithm may further include a kernel trick to distinguish a dataset pattern before applying the PCA, and the robot hand system 100 may perform non-linear mapping of feature points of the dataset by means of the kernel trick. To enhance accuracy of classifying the dataset, the robot hand system 100 may use a kPCA algorithm to which at least one kernel function is applied.

For an EMG signal, because the kPCA algorithm to which the kernel function is applied does not provide output data in a learning process and provides only information about a moving finger, it may be used as an unsupervised learning scheme. Furthermore, by means of the kPCA algorithm to which the kernel function is applied, the robot hand system 100 may detect a non-linear characteristic of a muscle motion pattern, may maximally follow an efferent command structure of the human body composed of multiple layers of complex structures, and may know muscle synergies associated with motion of each of fingers. Furthermore, the applying of the kernel function capable of non-linearly increasing a dimension of the dataset may concentrate on an activated degree of freedom (DOF) while suppressing estimation of a deactivated DOF. Unsupervised learning (or semi-unsupervised learning) based on the kPCA algorithm to which the kernel function is applied may calculate (or evaluate) a mapping function for each of a plurality of fingers. Thus, the robot hand system 100 may obtain a mapping function of each of fingers for real-time implementation without an output value and may determine motion of each of the fingers by means of EMG measurement of a patient with part of a finger amputated.

In operation 430, the robot hand system 100 may operate a robot hand 130 of FIG. 2 in response to the estimated motion intention. For example, a controller 120 of FIG. 2 may generate a control command according to the estimation motion intention and may deliver the generated control command to the robot hand 130.

In operation 440, the robot hand system 100 may output feedback on the estimated motion intention through an output device 140 of FIG. 2. In an embodiment, the robot hand system 100 may omit operation 440.

The kernel matrix evaluations may be processed through learning mapping functions and for calculating real time motion. Hereinafter, the kernel function evaluated for learning mapping function may be referred to as a first kernel matrix, and the kernel function evaluated for calculating real time motion may be referred to as a second kernel matrix henceforth.

Figure 5:
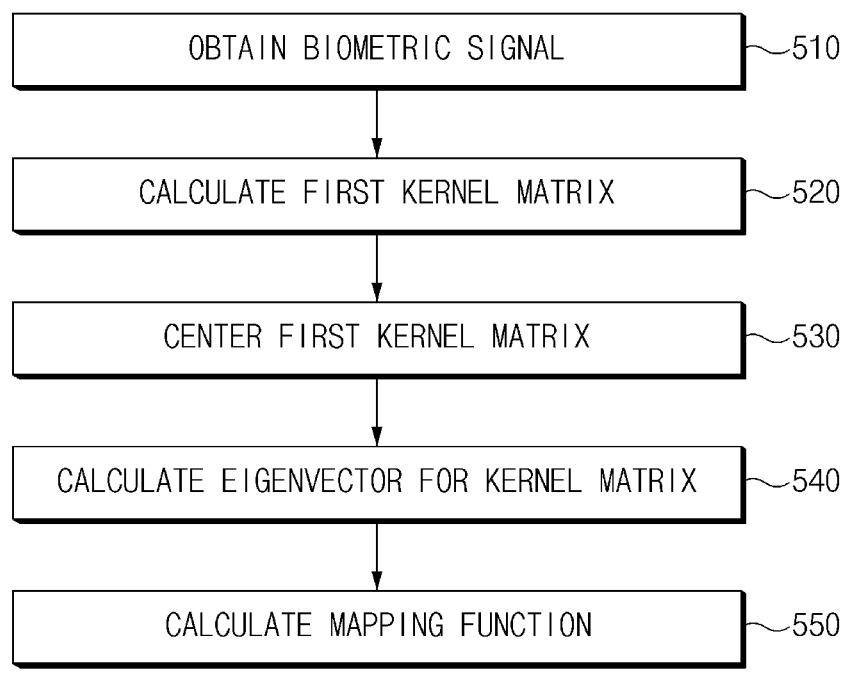
FIG. 5 illustrates an optional flowchart for learning a mapping function according to various embodiments.

FIG. 5 illustrates an optional flowchart for learning a mapping function according to various embodiments.

Referring to FIG. 5, in operation 510, a robot hand system 100 of FIG. 2 may obtain a biometric signal for learning. For example, a dataset 'X' of an EMG signal obtained through 8 channels (8 electrodes) A, B, C, D, E, F, G, and H may be represented as $X \in R^{T \times d}$, T may represent a time sample of the measured record, and d may represent the number of dimensions (i.e., 8 dimensions).

In operation 520, a robot hand system 100 may calculate a first kernel matrix 'K' for the obtained biometric signal. The kernel matrix 'K' may be calculated based on at least one kernel matrix. For example, when a hyperbolic tangent function is used as a kernel function, the first kernel matrix 'K' may be represented as $K \in R^{T \times T} = \tanh(X \times X^T)$. For another example, when a polynomial function is used, the first kernel matrix 'K' may be represented as $K \in R^{T \times T} = X \times X^T$. For another example, when a Gaussian function is used as a kernel function, the first kernel matrix 'K' may be represented as $$K \in R^{T \times T} = \exp\left(-\frac{\|X - Y\|^2}{2} \times b\right),$$

and Y and b may be selected in a learning step.

Because the first kernel matrix 'K' is not centered, in operation 530, the robot hand system 100 may center the first kernel matrix 'K'. For example, the centered first kernel matrix $K_{centered}$ may be calculated as Equation 1 below.

$$K_{centered} = K - \frac{1}{T}1_T K - \frac{1}{T}K 1_T + \frac{1}{T^2}1_T K 1_T \qquad \text{Equation 1}$$

In Equation 1 above, $1_T$ may refer to a matrix with a T×T size.

In operation 540, the robot hand system 100 may calculate an eigenvector 'P' for the centered first kernel matrix. The eigenvector 'P' may refer to a principal component of the centered first kernel matrix. In an embodiment, the robot hand system 100 may calculate the eigenvector 'P' using a single value decomposition (SVD) algorithm. The eigenvector 'P' may be represented as P=Eigenvector($K_{centered}$), where $P \in R^{T \times T}$.

In operation 550, the robot hand system 100 may calculate a mapping function 'U'. There may be a need to select an eigenvector maximizing variance of the first kernel matrix to calculate a mapping function of each of the fingers, and such an eigenvector may be referred to as a principal component of a dataset. Thus, the robot hand system 100 may select a first column of the eigenvector 'P' to calculate the mapping function U (or a mapping matrix U). The mapping function U may be represented as U=P(:,1), where $U \in R^{T \times 1}$. The learned mapping function may be used to estimate a motion intention corresponding to a subsequently obtained biometric signal.

In an embodiment, the robot hand system 100 may normalize a component of the eigenvector using the square root of an eigenvalue λ to finally calculate a mapping function of a specific finger. For example, a mapping function $U_{thumb}$ of a thumb may be calculated as Equation 2 below.

$$U_{thumb} = \left[\frac{u_1}{\sqrt{\lambda_1}} \; \frac{u_2}{\sqrt{\lambda_2}} \; \ldots \; \frac{u_n}{\sqrt{\lambda_n}}\right]^T \qquad \text{Equation 2}$$

In the same manner, the robot hand system 100 may calculate a mapping function of each of an index finger, a middle finger, a ring finger, and a pinky finger.

Figure 6:
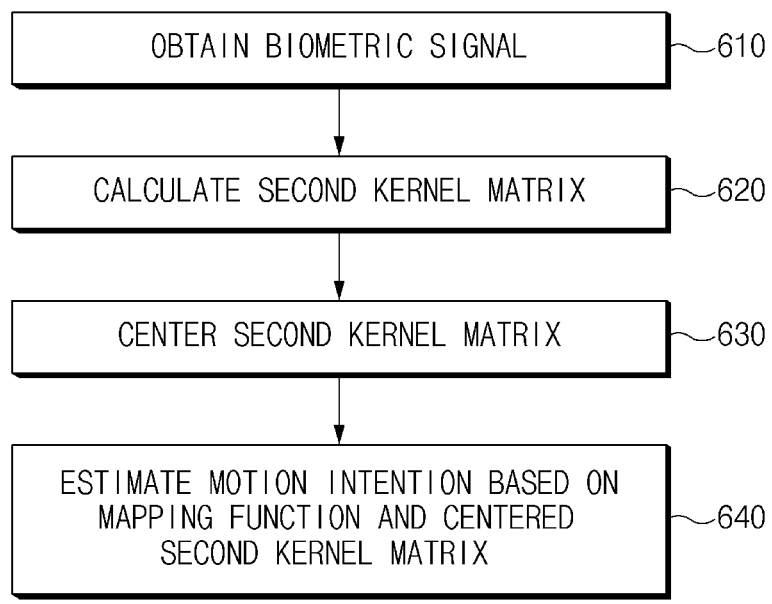
FIG. 6 illustrates an operational flowchart for estimating a motion intention according to various embodiments.

FIG. 6 illustrates an operational flowchart for estimating a motion intention according to various embodiments. Operations shown in FIG. 6 illustrate an example of an operation (e.g., operation 420 of FIG. 4) of estimating a motion intention in real time using a mapping function learned by the process of FIG. 5.

Referring to FIG. 6, in operation 610, a robot hand system 100 of FIG. 2 may obtain a biometric signal. For example, a dataset 'Z' of an EMG signal for a thumb may be represented as $Z \in R^{t \times d}$, t may denote the number of time samples, and d may denote the number of dimensions (e.g., d=8 when the number of EMG channels is 8).

In operation 620, the robot hand system 100 may calculate a second kernel matrix $K_z$ for the biometric signal. The second kernel matrix $K_z$ may be calculated from a dataset 'X' obtained in operation 510 of FIG. 5 and the dataset 'Z' obtained in operation 610. For example, when a hyperbolic tangent function is used as a kernel function, the second kernel function $K_z$ may be calculated based on Equation 3 below.

$$K_Z = \tanh(Z \times X^T) = \tanh([Z \times X_1, Z \times X_2, \ldots, Z \times X_T]) \qquad \text{Equation 3}$$

For another example, when a polynomial function is used, the second kernel matrix $K_z$ may be calculated based on Equation 4 below.

$$K_Z = Z \times X^T = [Z \times X_1, Z \times X_2, \ldots, Z \times X_T] \qquad \text{Equation 4}$$

For example, when a Gaussian function is used, the second kernel matrix $K_z$ may be calculated based on Equation 5 below.

$$K_Z = e^{-b(\|Z - X_1\|^2, \|Z - X_2\|^2, \ldots, \|Z - X_T\|^2)/2} \qquad \text{Equation 5}$$

In Equation 5 above, Z, X, and $K_z$ may be the same in size as each other.

In operation 630, the robot hand system 100 may center the second kernel matrix $K_z$. For example, the centered second kernel matrix $K_{centered}$ may be calculated by means of Equation 6 below.

$$K_{centered} = K_z - \frac{1}{n}1_{n \times m}^T K - \frac{1}{n}K 1_{n \times n} + \frac{1}{n^2}1_{n \times m}^T K 1_{n \times n} \qquad \text{Equation 6}$$

$1_{n \times m}$ may denote the matrix having a specified size n or m, n may be T, and m may be t.

In operation 640, the robot hand system 100 may estimate a motion intention based on the mapping function and the centered second kernel matrix. For example, an output value $Y_{thumb}$ indicating a motion intention for a thumb may be calculated by multiplication of the mapping function $U_{thumb}$ for the thumb and the centered second kernel matrix $K_{centered}$. Using the same principle, each of output values $Y_{index}$, $Y_{middle}$, $Y_{ring}$, and $Y_{pinky}$ indicating a motion intention for each of an index finger, a middle finger, a ring finger, or a pinky finger may be calculated.

Figure 7:
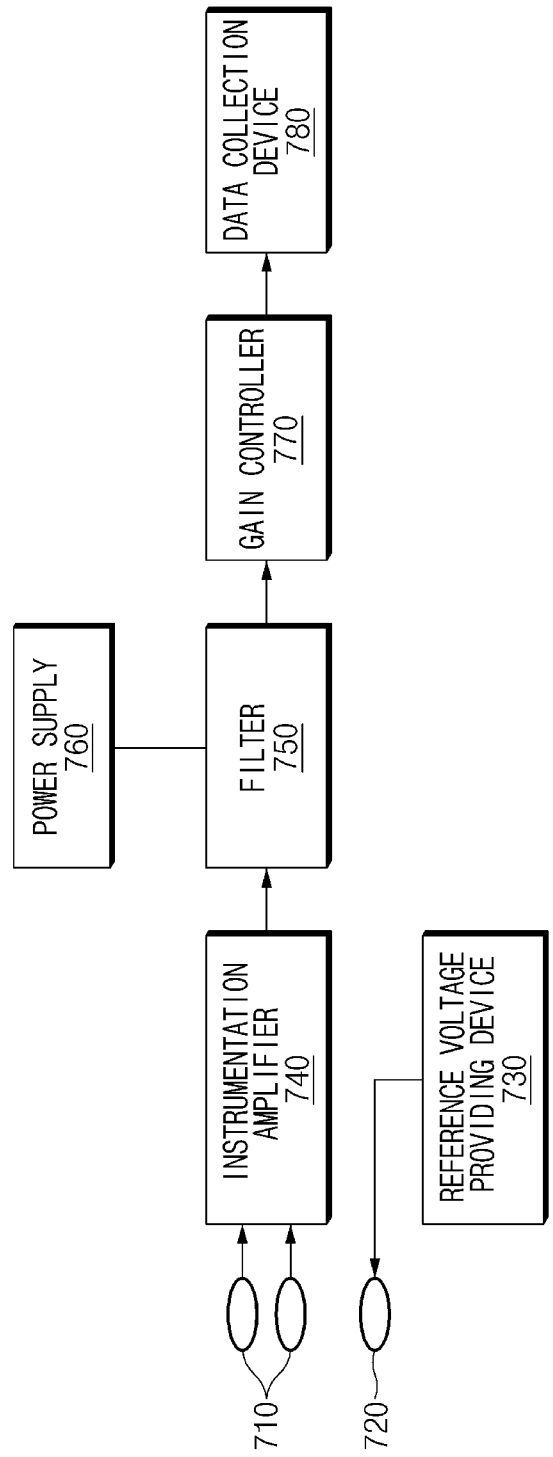
FIG. 7 illustrates a block diagram of a biometric sensor system according to various embodiments.

FIG. 7 illustrates a block diagram of a biometric sensor system 110 according to various embodiments.

Referring to FIG. 7, the biometric sensor system 110 may include a reference electrode 720 to which a reference voltage (e.g., 1.65 V) is supplied through a reference voltage providing device 730, as well as an EMG electrode 710 made of silver. An instrumentation amplifier 740 may amplify a signal received through the EMG electrode 710 by a specified gain (e.g., 100 dB). A filter 750 may be, for example, a 3rd-order band pass filter (BPF). The filter 750 may filter the signal at a specified frequency (e.g., 16.3 Hz to 613 Hz). A power supply 760 may supply a specified power (e.g., 3.3 V) to a biometric sensor system 110 of FIG. 2 in a single direction. A gain controller 770 may adjust the filtered signal to a specified gain value (e.g., 20 dB). A data collection device 780 may collect data (e.g., a dataset) for the signal, the gain value of which is adjusted.

Figure 8:
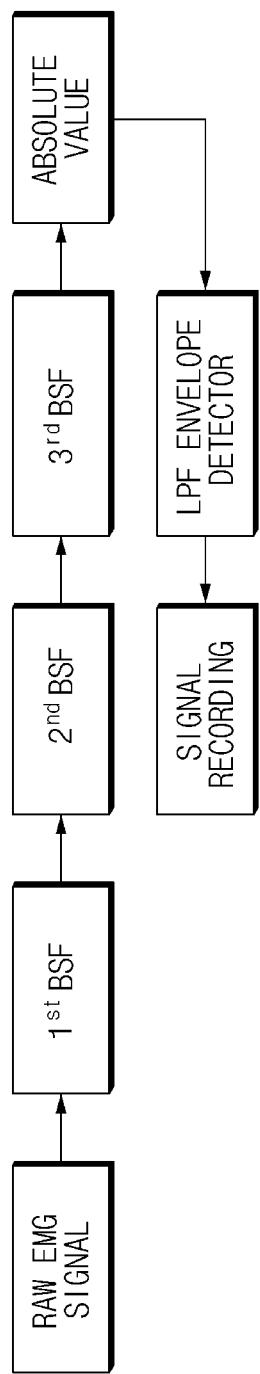
FIG. 8 illustrates an operational block diagram for recording an EMG signal according to various embodiments.

FIG. 8 illustrates an operational block diagram for recording an EMG signal according to various embodiments.

Referring to FIG. 8, a data analysis device 122 of FIG. 2 may obtain a raw EMG signal. The data analysis device 122 may perform frequency filtering three times using band stop filters (BSFs). Each of the BSFs may be a 3rd- or 8th-order filter. The respective BSFs may support different frequency bands. For example, the data analysis device 122 may perform filtering at a frequency of 58 Hz to 62 Hz, a frequency of 178 Hz to 182 Hz, and a frequency of 50 Hz to 150 Hz. The data analysis device 122 may obtain an absolute value of the signal by means of the filtering. The data analysis device 122 may cut off the signal at a specified frequency (e.g., 1.5 Hz) by means of a low pass filter (LPF) envelope detector and may record a subsequent signal.

Figure 9:
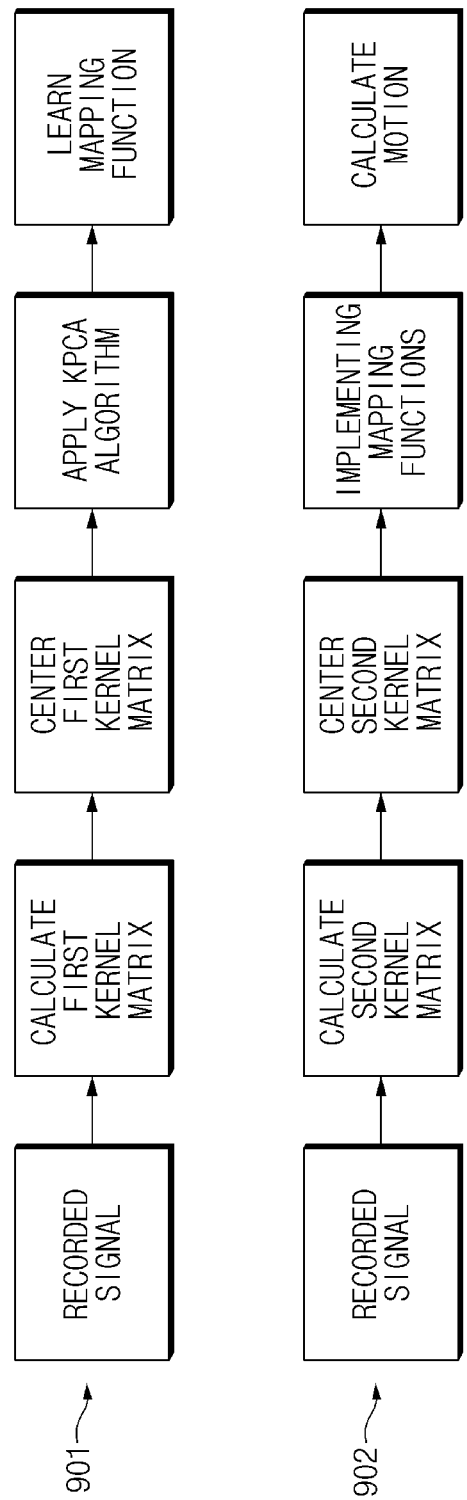
FIG. 9 illustrates an operational block diagram for calculating motion according to various embodiments.

FIG. 9 illustrates an operational block diagram for calculating motion according to various embodiments.

Referring to FIG. 9, in learning (901) a mapping function, a data analysis device 122 of FIG. 2 may calculate a first kernel matrix based on a recorded signal and may center the calculated first kernel matrix. The data analysis device 122 may learn the mapping function by applying a kPCA algorithm to the centered first kernel matrix. In calculating (902) motion, the data analysis device 122 may obtain a recorded signal, may calculate a second kernel matrix based on the obtained signal, and may center the calculated second kernel matrix. The data analysis device 122 may calculate the motion by implementing the learned mapping function to the centered second kernel matrix.

Figure 10:
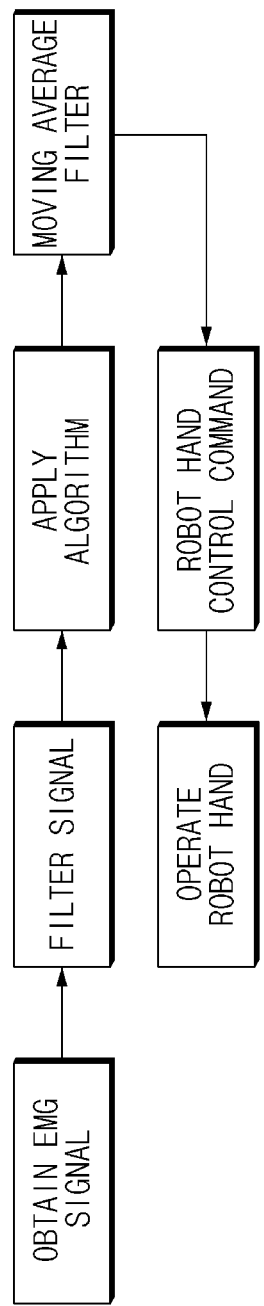
FIG. 10 illustrates an operational block diagram for delivering a control command to a robot hand according to various embodiments.
Figure 11A:
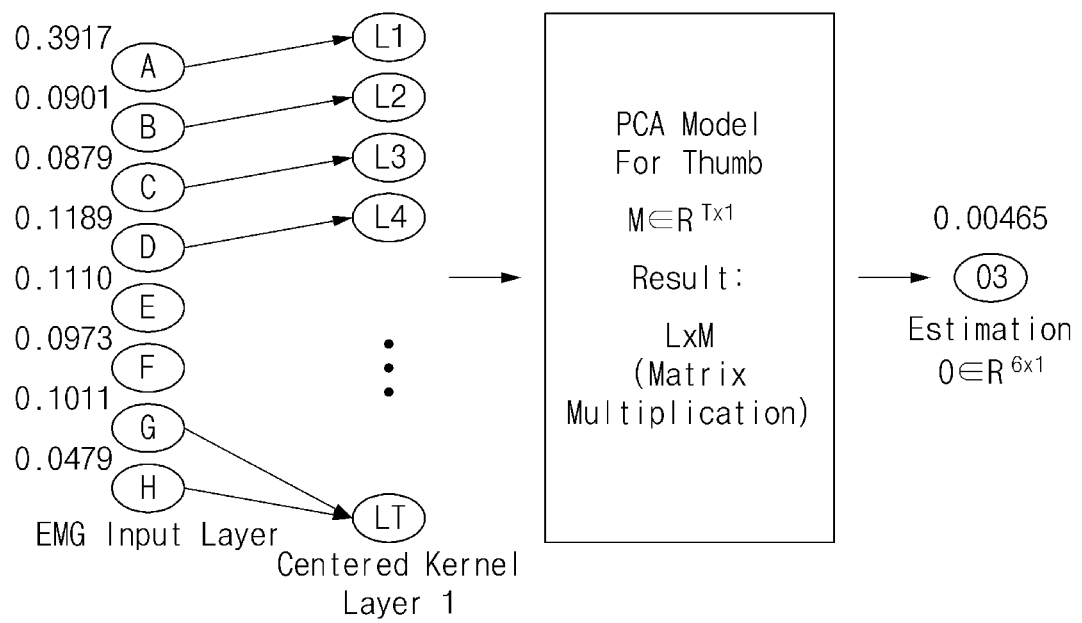
FIGS. 11A, 11B, 11C, and 11D illustrate an algorithm for estimating a motion intention for each finger according to various embodiments.
Figure 11B:
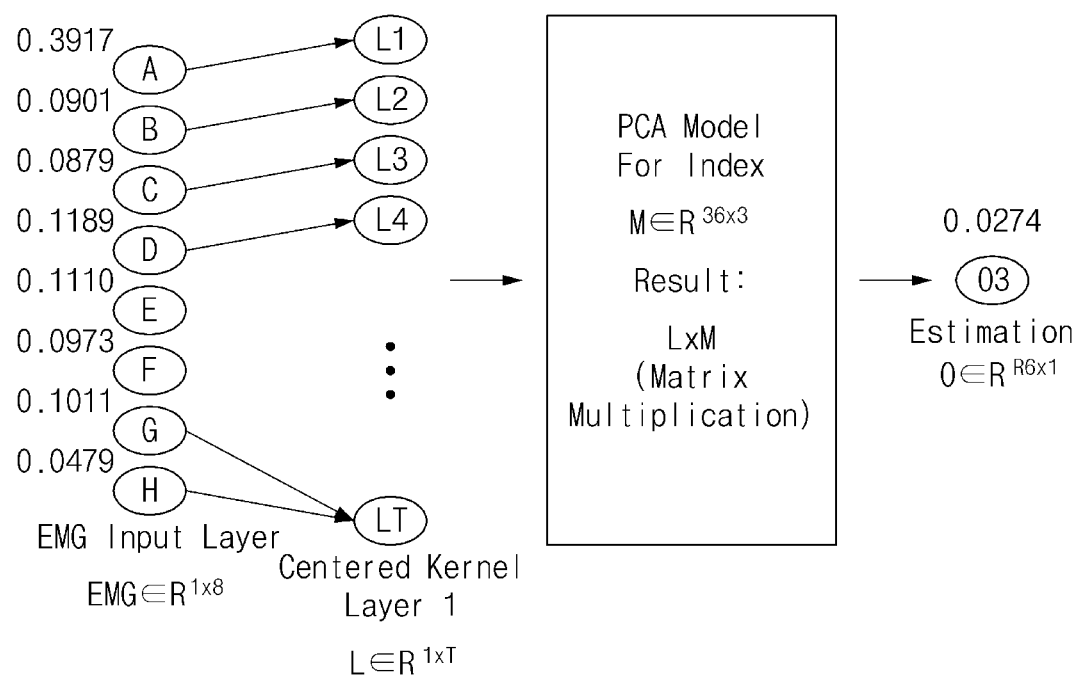
Figure 11C:
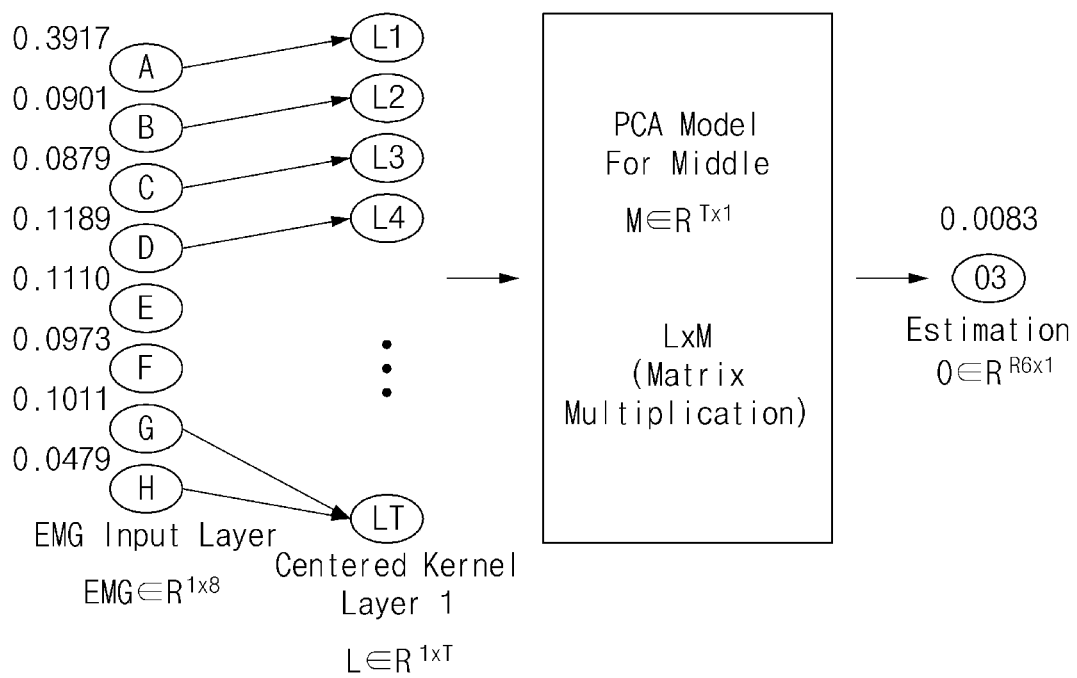
Figure 11D:
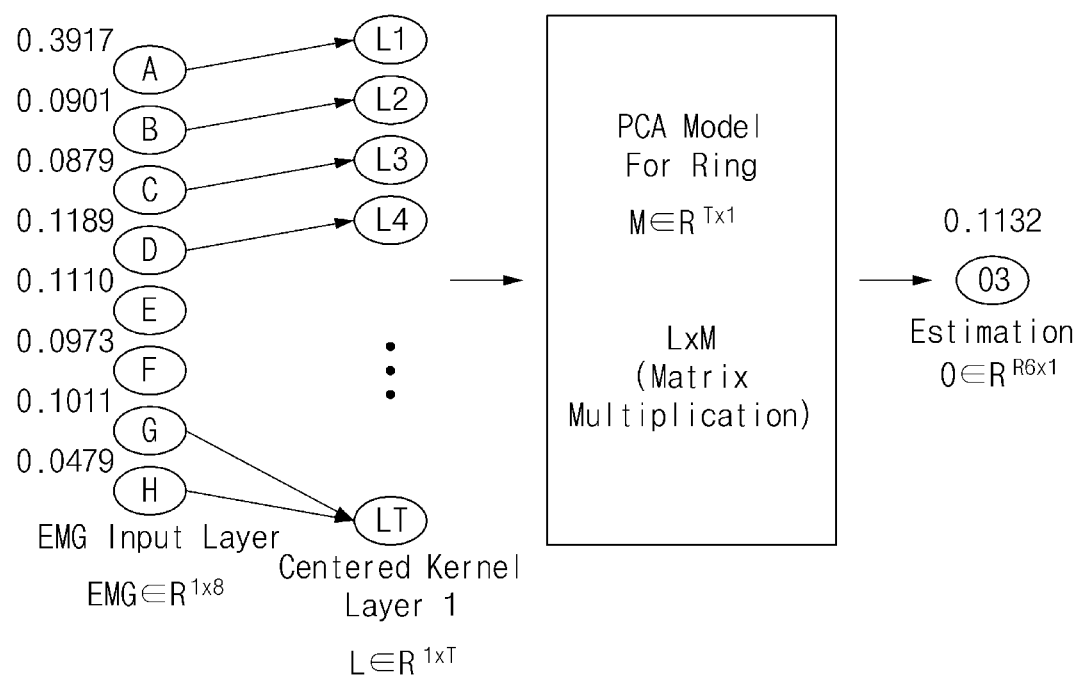

FIG. 10 illustrates an operational block diagram for delivering a control command to a robot hand according to various embodiments.

Referring to FIG. 10, a biometric sensor system 110 of FIG. 2 may obtain an EMG signal and may filter a signal. A data analysis device 122 of FIG. 2 may estimate a motion intention by applying a kPCA algorithm to which at least one kernel function is applied to the filtered signal. A robot controller 124 of FIG. 2 may generate a control command of a robot hand 130 of FIG. 2 by applying a moving average filter to a value indicating the motion intention. The robot hand 130 may operate depending on the generated control command.

FIGS. 11A to 11D illustrate an algorithm for estimating a motion intention for each finger according to various embodiments. FIGS. 11A to 11D illustrate a response of a kPCA model corresponding to a thumb, an index finger, a middle finger, and a ring finger with respect to the same biometric signal. When the ring finger moves, an estimation value 0.1132 for the ring finger may be shown to be higher than estimation values for the other fingers.

Figure 12A:
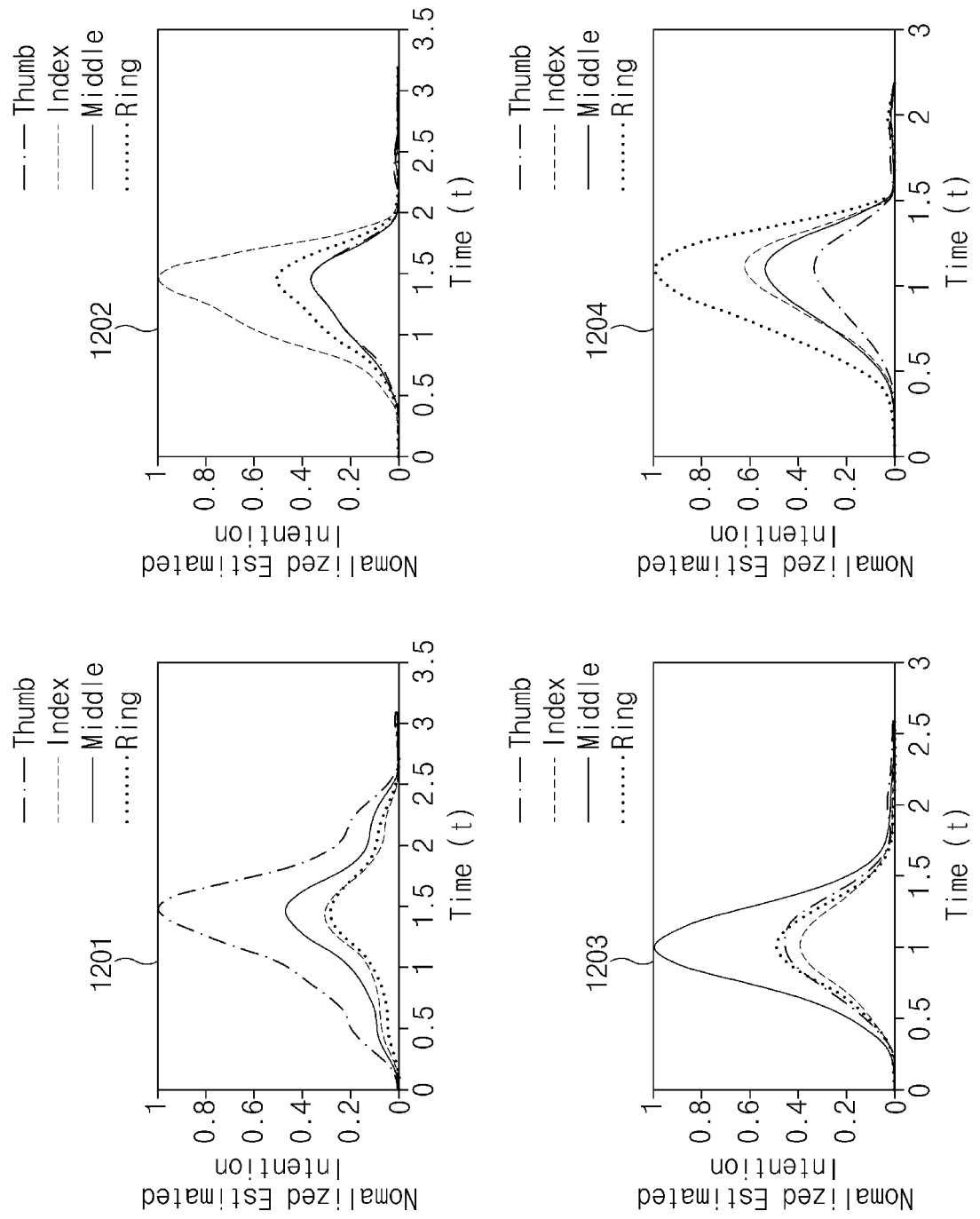
FIGS. 12A, 12B, 12C, and 12D illustrate graphs illustrating the result of estimating a motion intention according to various embodiments.
Figure 12B:
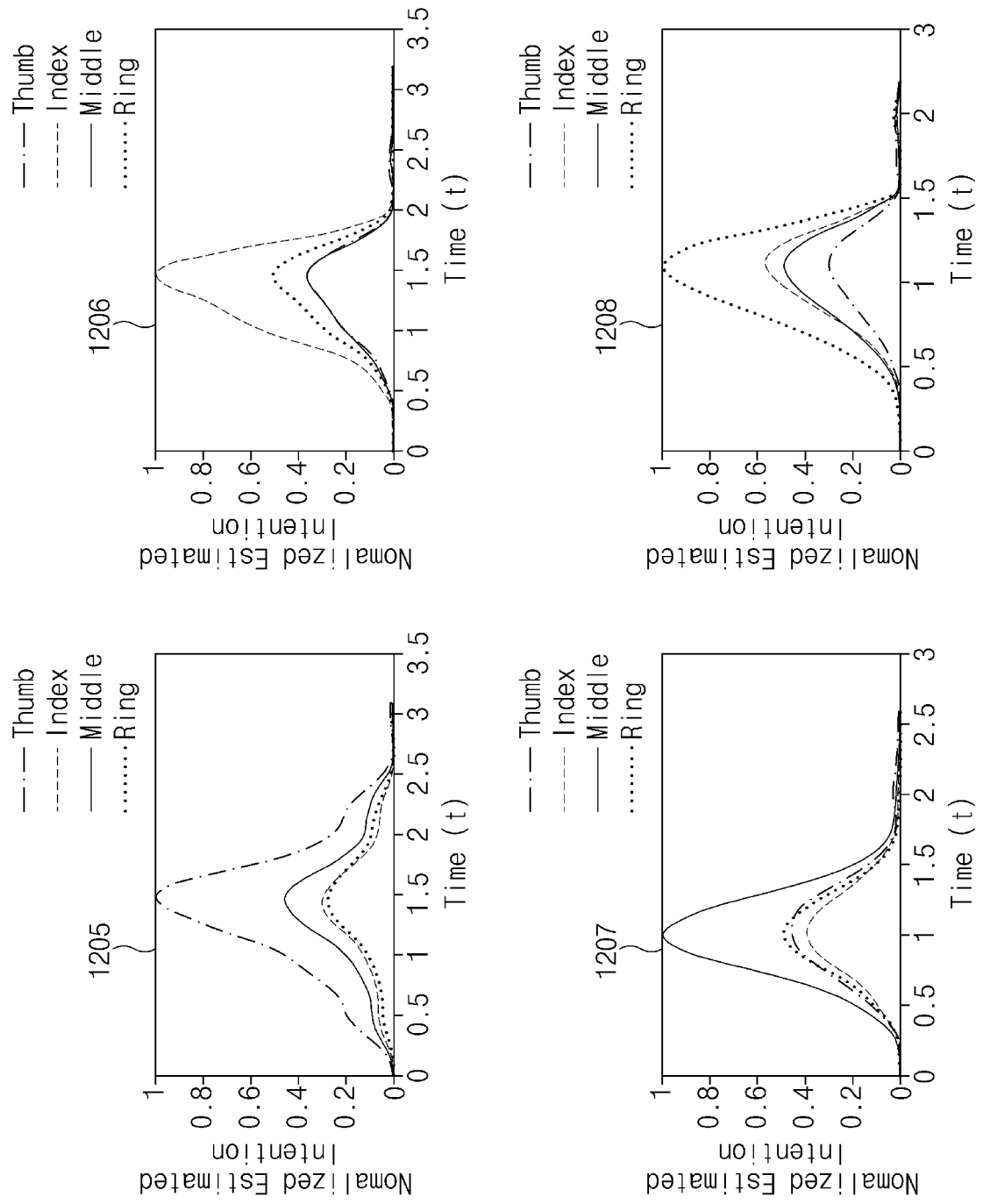
Figure 12C:
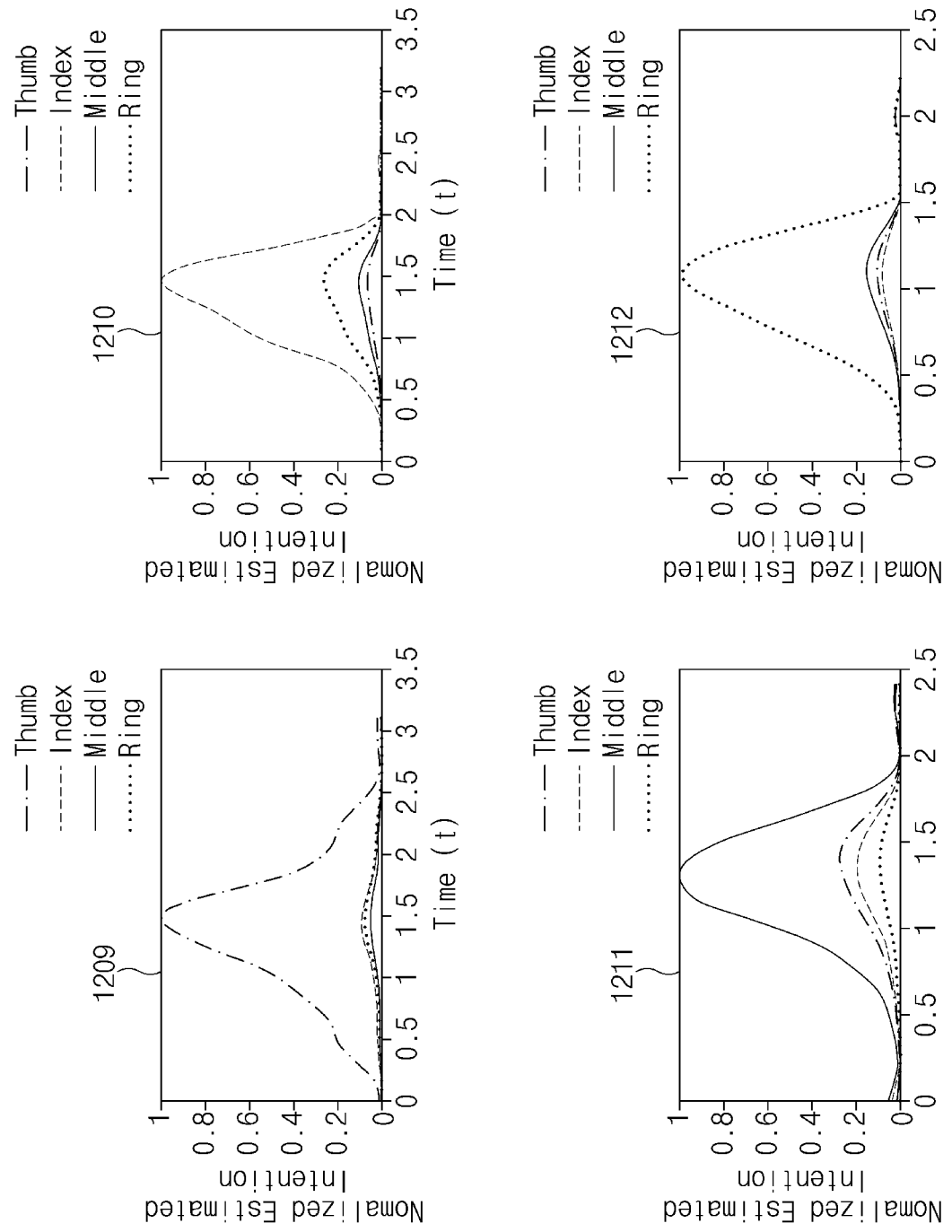
Figure 12D:
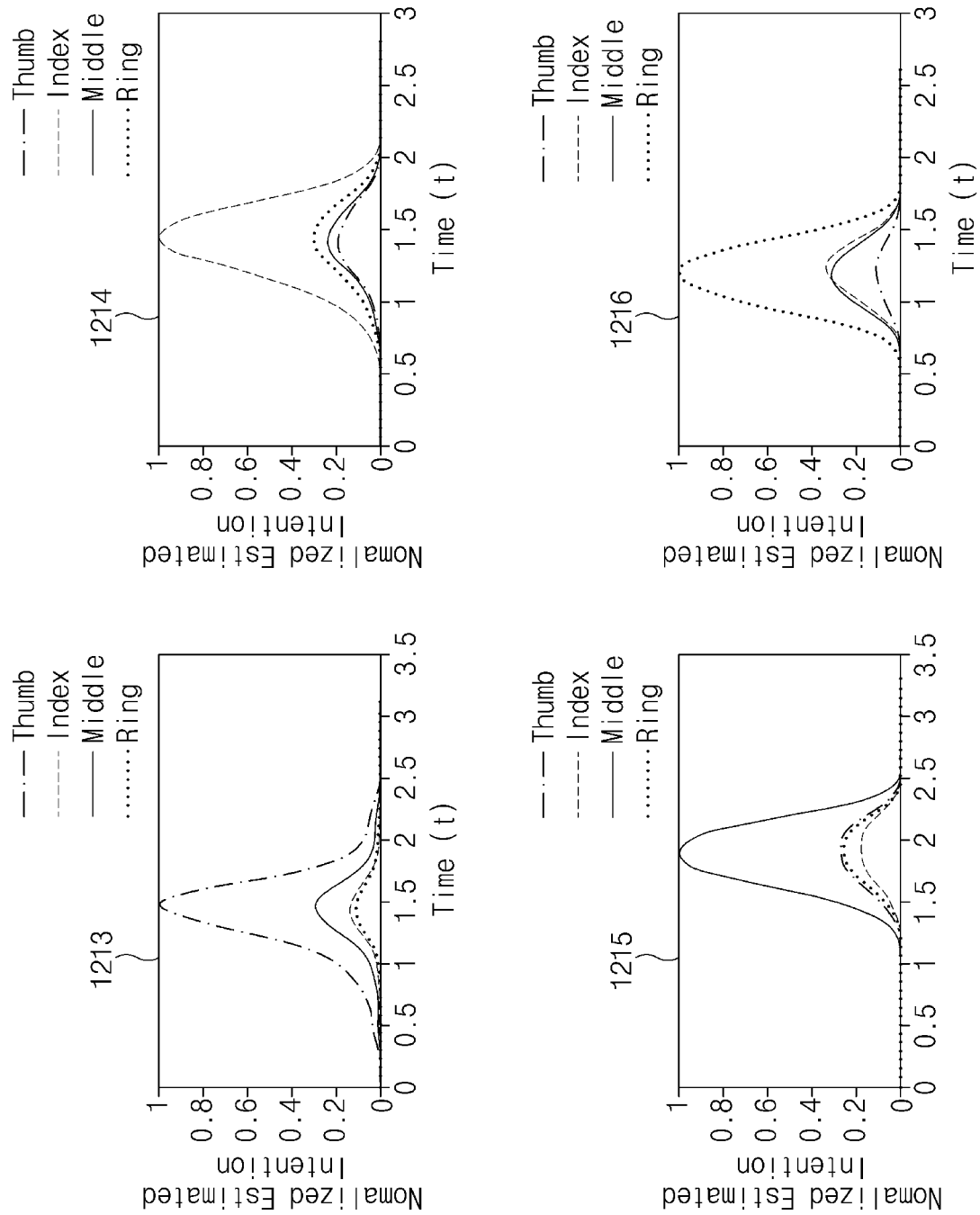

FIG. 12A to 12D illustrate graphs illustrating the result of estimating a motion intention according to various embodiments. FIG. 12A illustrates an estimation result when a hyperbolic tangent function is used as a kernel function. FIG. 12B illustrates an estimation result when a polynomial function is used as a kernel function. FIG. 12C illustrates an estimation result when a Gaussian is used as a kernel function. Furthermore, a top left graph 1201, 1205, or 1209 on each drawing illustrates a result when a thumb moves. A top right graph 1202, 1206, or 1210 on each drawing illustrates a result when an index finger moves. A bottom left graph 1203, 1207, or 1211 on each drawing illustrates a result when a middle finger moves. A bottom right graph 1204, 1208, or 1212 on each drawing illustrates a result when a ring finger moves.

Figure 13A:
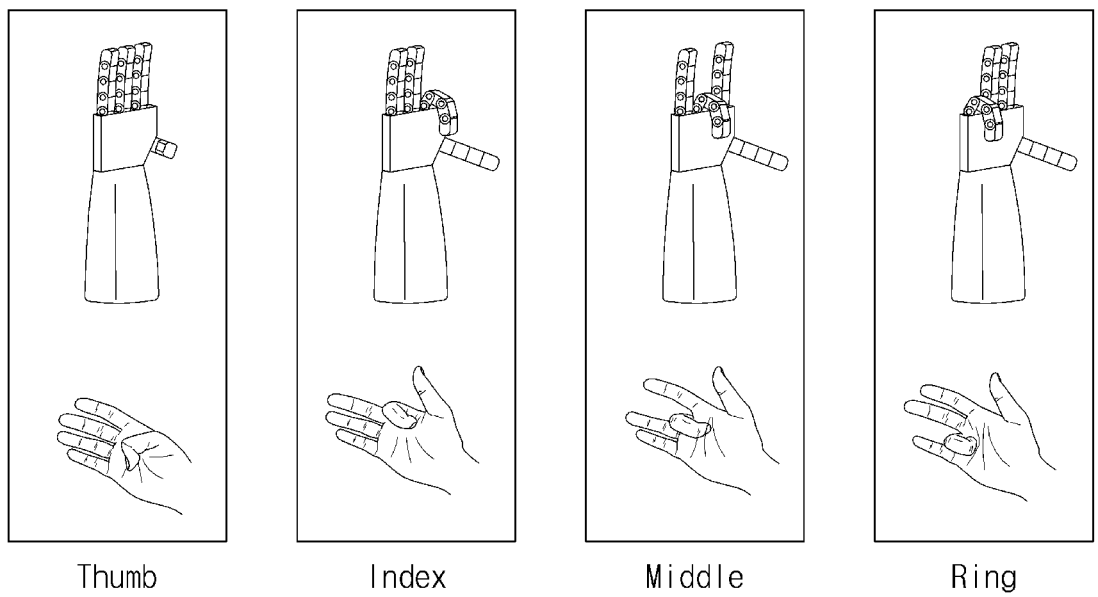
FIGS. 13A and 13B illustrate motion of a robot hand according to various embodiments.
Figure 13B:
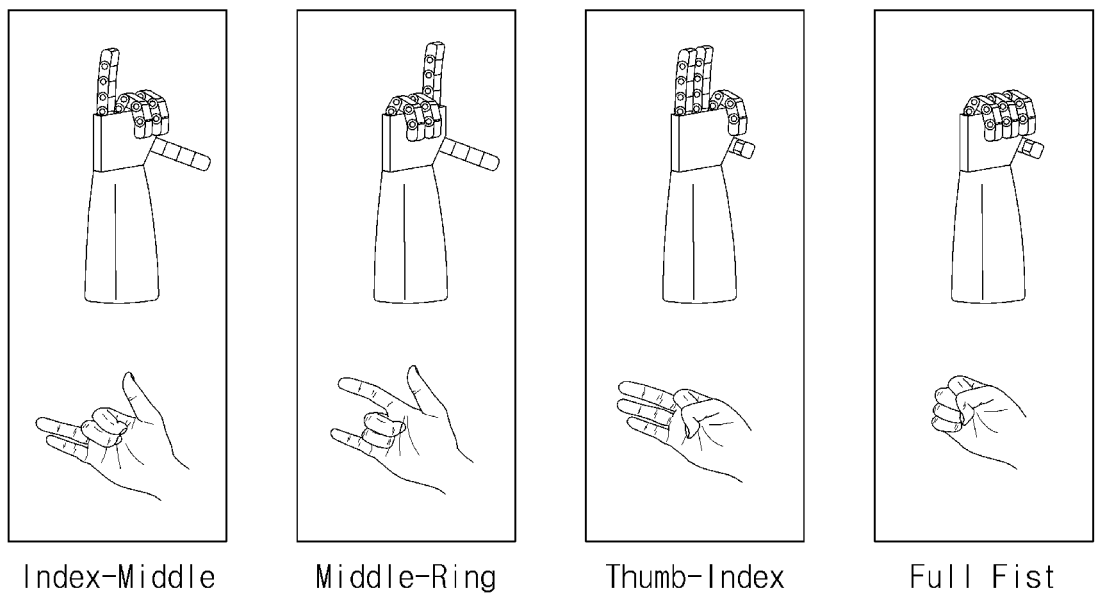

FIGS. 13A and 13B illustrate motion of a robot hand according to various embodiments.

FIG. 13A illustrates motion of a robot hand 130 of FIG. 2, when one finger moves. FIG. 13B illustrates motion of the robot hand 130, when at least two or more fingers move. Because a robot hand system 100 of FIG. 2 is able to accurately estimate a motion intention for each finger of a user, it may operate a finger included in the robot hand 130 in response to one or more finger motion.

According to embodiments disclosed in the present disclosure, the robot hand system may more accurately estimate a motion intention of a user's hand for moving a robot hand.

According to embodiments disclosed in the present disclosure, the robot hand system may derive an estimation result optimized for SPC control for the robot hand, without the necessity of describing the amount of a proportional force generated in a learning process.

According to embodiments disclosed in the present disclosure, the robot hand system may use a better control command for a separate finger using a PCA algorithm.

According to embodiments disclosed in the present disclosure, the robot hand system may more efficiently identify a motion intention of the user with part of a finger amputated and may move the robot hand.

According to embodiments disclosed in the present disclosure, the robot hand system may analyze an EMG signal by means of an offline analysis.

In addition, various effects ascertained directly or indirectly through embodiments of the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A robot hand system, the system comprising:
a biometric sensor system;
a robot hand including a plurality of fingers; and
a controller connected with the biometric sensor system and the robot hand, wherein the controller is configured to:

obtain a biometric signal using the biometric sensor system;
estimate a motion intention by applying a kernel principal component analysis to which at least one kernel function is applied to the biometric signal;
calculate a first kernel matrix for a recorded biometric signal using the at least one kernel function;
center the first kernel matrix;
calculate an eigenvector for the first kernel matrix;
learn a mapping function based on the eigenvector;
calculate a second kernel matrix for the biometric signal using the at least one kernel function;
center the second kernel matrix;
estimate the motion intention based on the learned mapping function and the centered second kernel matrix; and
deliver a control command corresponding to the estimated motion intention to the robot hand.

2. The system of claim 1, further comprising an output device, wherein the controller is configured to output a graphic user interface indicating the estimated motion intention through the output device.

3. The system of claim 1, wherein the biometric sensor system comprises:
a plurality of electrodes configured to receive a signal;
an instrumentation amplifier configured to measure and amplify the received signal;
a filter configured to filter the amplified signal at a specified frequency band;
a gain controller configured to adjust a gain of the filtered signal to a specified value; and
a data collection device configured to collect data for the biometric signal from the signal, the gain of which is adjusted.

4. The system of claim 1, wherein the controller is configured to generate the control command by applying a moving average filter to the estimated motion intention.

5. A method of operating a robot hand system, the method comprising:
obtaining a biometric signal;
estimating a motion intention by applying a kernel principal component analysis to which at least one kernel function is applied to the biometric signal;
calculating a first kernel matrix for a recorded biometric signal based on the at least one kernel function;
centering the first kernel matrix;
calculating an eigenvector for the first kernel matrix;
learning a mapping function based on the eigenvector;
calculating a second kernel matrix for the biometric signal based on the at least one kernel function;
centering the second kernel matrix;
estimating the motion intention based on the learned mapping function and the centered second kernel matrix; and
operating a robot hand in response to the estimated motion intention.

6. The method of claim 5, further comprising outputting a graphic user interface indicating the estimated motion intention.

7. The method of claim 5, wherein the robot hand includes a plurality of fingers.

8. The method of claim 5, further comprising:
receiving a signal;
measuring and amplifying the received signal;
filtering the amplified signal at a specified frequency band;
adjusting a gain of the filtered signal to a specified value; and
collecting data for the biometric signal from the signal, the gain of which is adjusted.

9. The method of claim 5, further comprising generating a control command by applying a moving average filter to the estimated motion intention.

10. A non-transitory computer-readable storage medium on which a program is stored, the program comprising instructions for performing steps of:
obtaining a biometric signal;
estimating a motion intention by applying a kernel principal component analysis to which at least one kernel function is applied to the biometric signal;
calculating a first kernel matrix for a recorded biometric signal based on the at least one kernel function;
centering the first kernel matrix;
calculating an eigenvector for the first kernel matrix; and
learning a mapping function based on the eigenvector;
calculating a second kernel matrix for the biometric signal based on the at least one kernel function;
centering the second kernel matrix; and
estimating the motion intention based on the learned mapping function and the centered second kernel matrix; and
operating a robot hand in response to the estimated motion intention.

11. The non-transitory computer-readable storage medium of claim 10, wherein the program further comprises instructions for outputting a graphic user interface indicating the estimated motion intention.

12. The non-transitory computer-readable storage medium of claim 10, wherein the program further comprises instructions for:
receiving a signal;
measuring and amplifying the received signal;
filtering the amplified signal at a specified frequency band;
adjusting a gain of the filtered signal to a specified value; and
collecting data for the biometric signal from the signal, the gain of which is adjusted.

13. The non-transitory computer-readable storage medium of claim 10, wherein the program further comprises instructions for generating a control command by applying a moving average filter to the estimated motion intention.

14. The system of claim 3, further comprising an output device, wherein the controller is configured to output a graphic user interface indicating the estimated motion intention through the output device.

15. The system of claim 3, wherein the controller is configured to generate the control command by applying a moving average filter to the estimated motion intention.

16. The method of claim 7, further comprising outputting a graphic user interface indicating the estimated motion intention.

17. The method of claim 7, further comprising:
receiving a signal;
measuring and amplifying the received signal;
filtering the amplified signal at a specified frequency band;
adjusting a gain of the filtered signal to a specified value; and
collecting data for the biometric signal from the signal, the gain of which is adjusted.

18. The method of claim 7, further comprising generating a control command by applying a moving average filter to the estimated motion intention.

19. The non-transitory computer-readable storage medium of claim 12, wherein the program further comprises instructions for outputting a graphic user interface indicating the estimated motion intention.

20. The non-transitory computer-readable storage medium of claim 12, wherein the program further comprises instructions for generating a control command by applying a moving average filter to the estimated motion intention.

* * * * *